J. T. SIMPSON.
AEROPLANE.
APPLICATION FILED APR. 5, 1910.
1,056,844.
Patented Mar. 25, 1913.
6 SHEETS—SHEET 2.
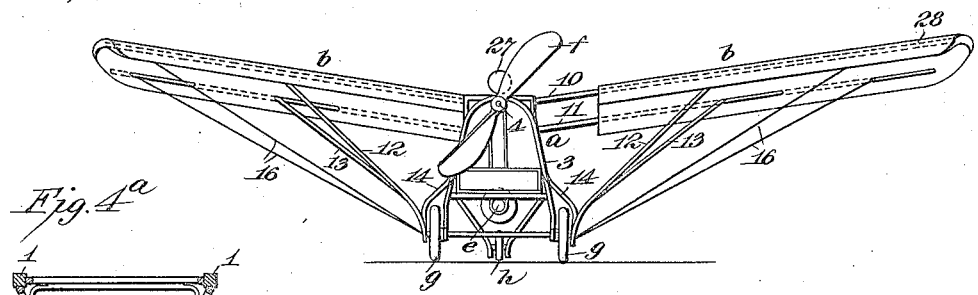
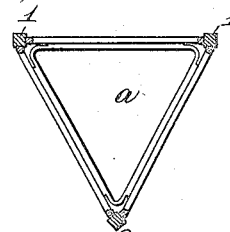
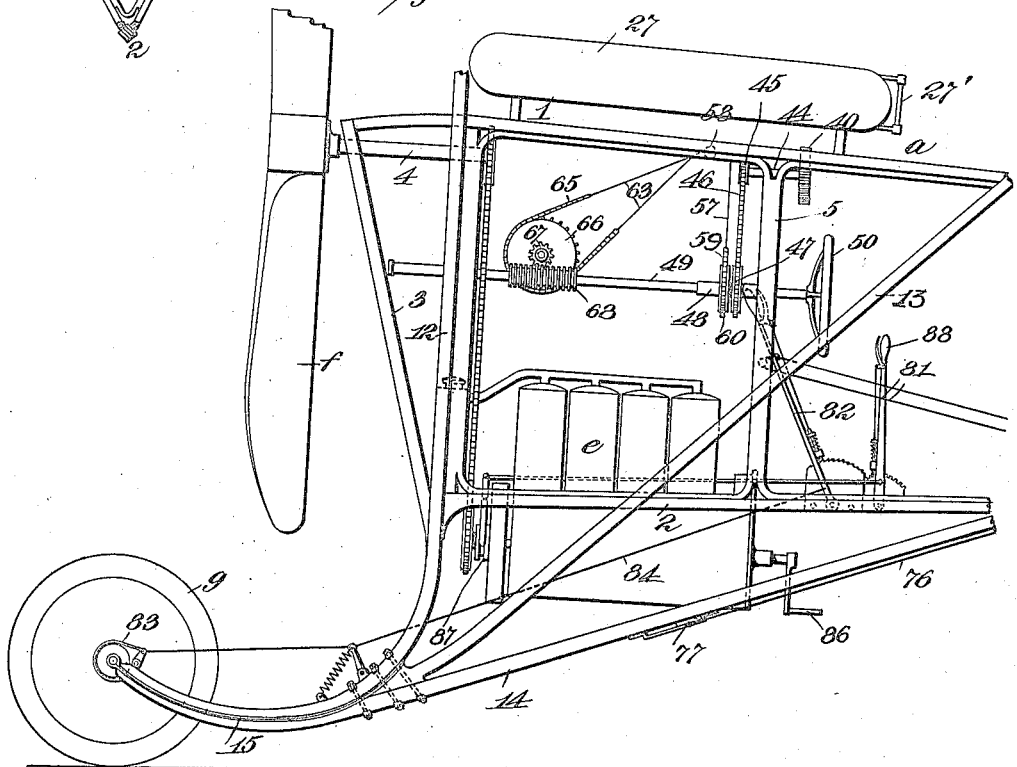
Witnesses:
Jas. F. Coleman
P. T. Ward
Inventor
John Thomas Simpson
By Dyn & Dyn & Taylor
Attorneys.

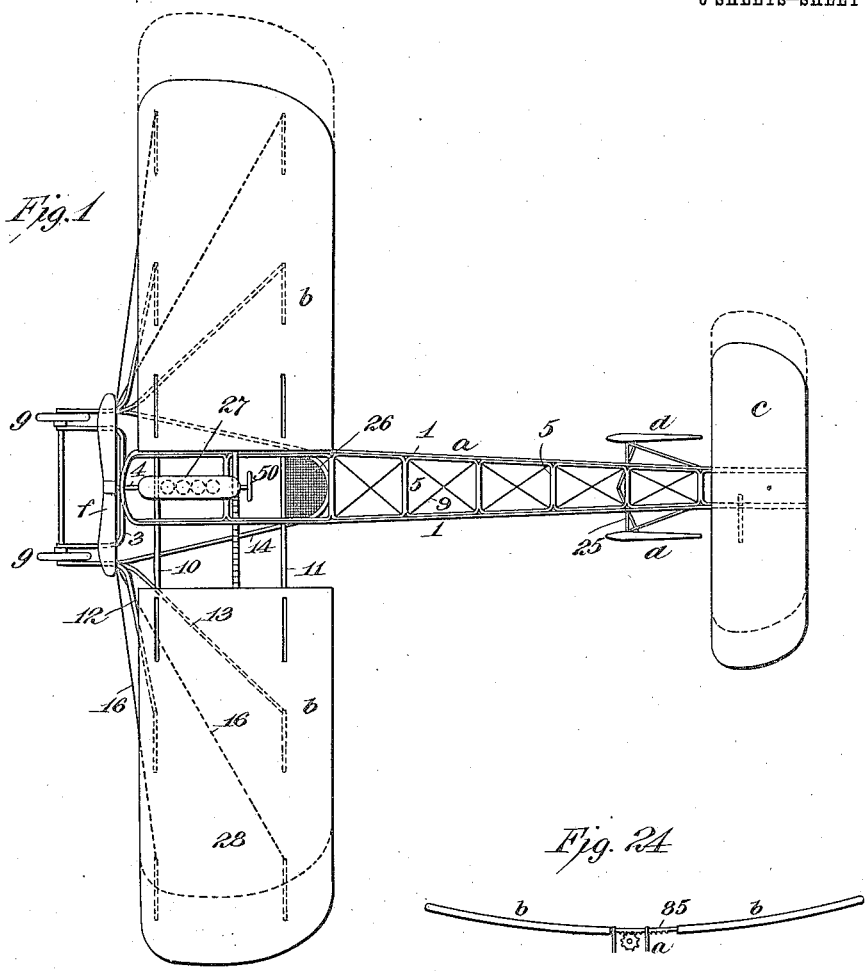
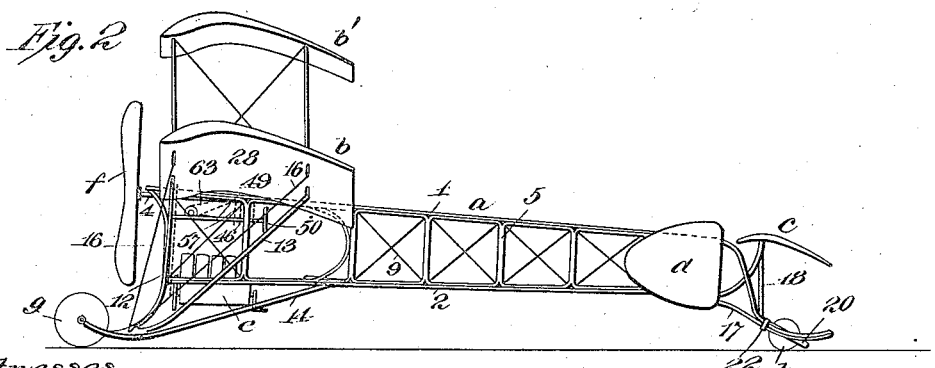

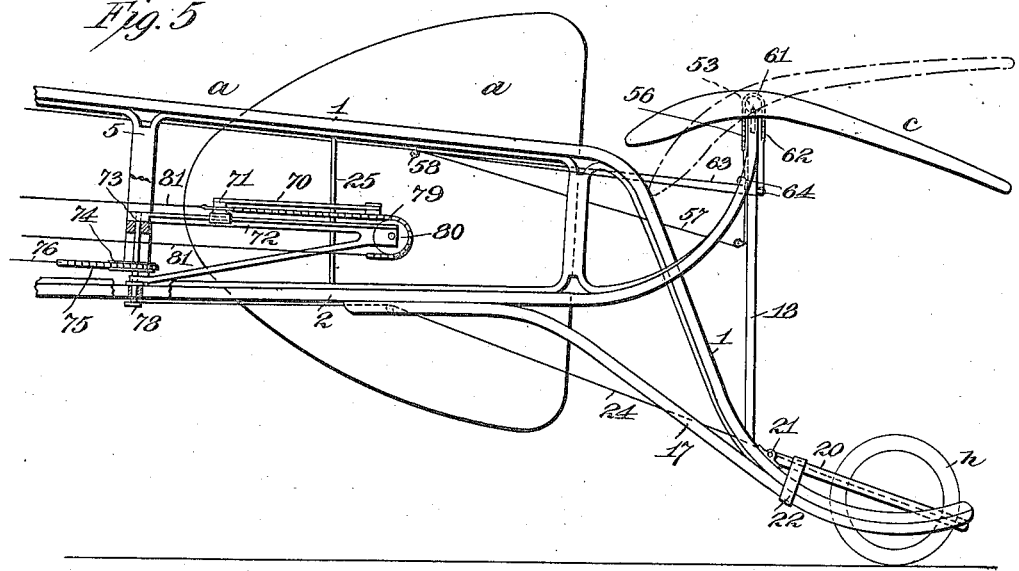
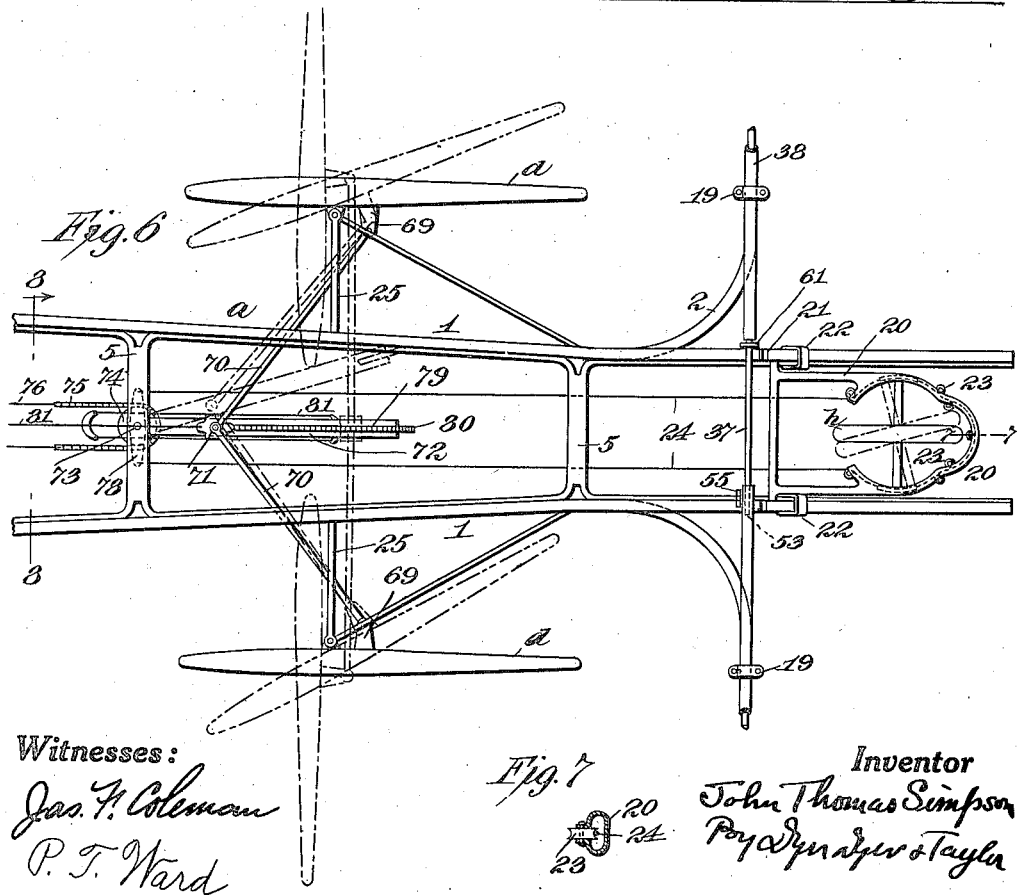

J. T. SIMPSON.
AEROPLANE.
APPLICATION FILED APR. 5, 1910.
1,056,844.
Patented Mar. 25, 1913.
6 SHEETS—SHEET 4.
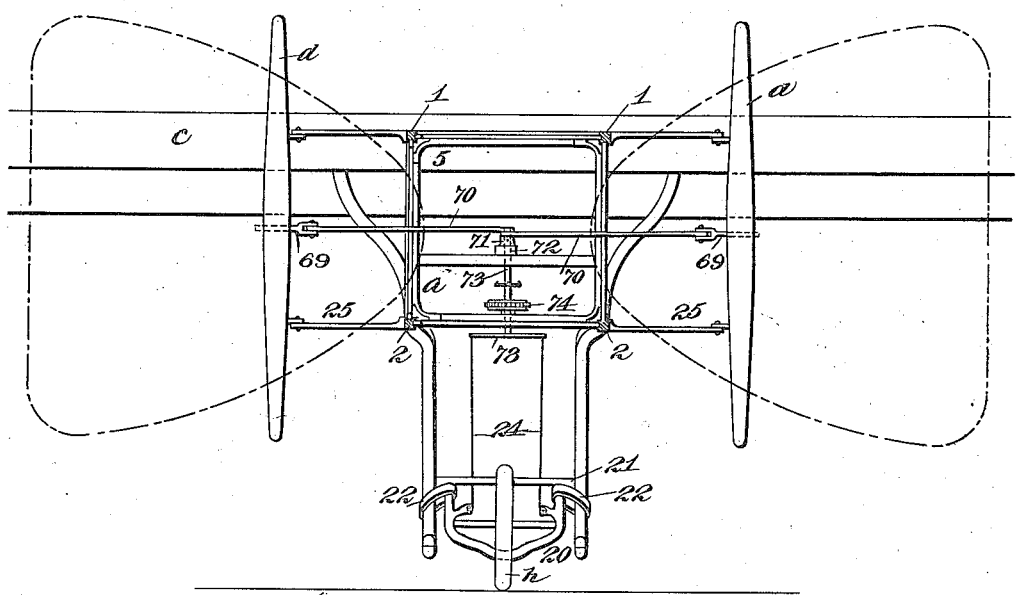
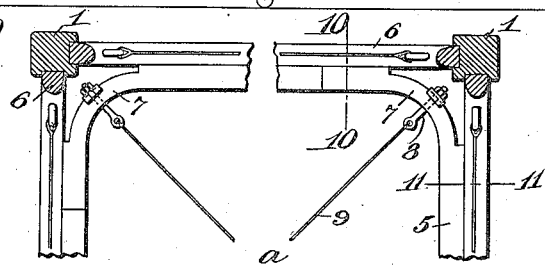
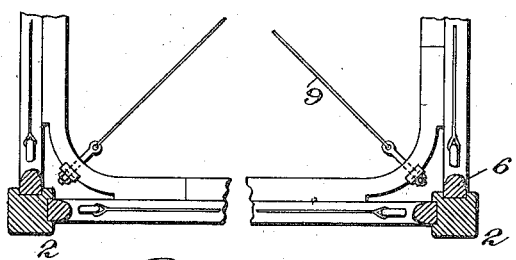
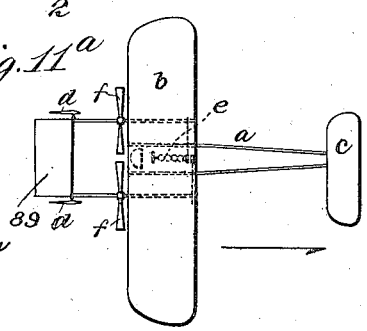
Witnesses:
Jas. F. Coleman
P. T. Ward
Inventor
John Thomas Simpson
By Dyer Dyer & Taylor
Attorneys.

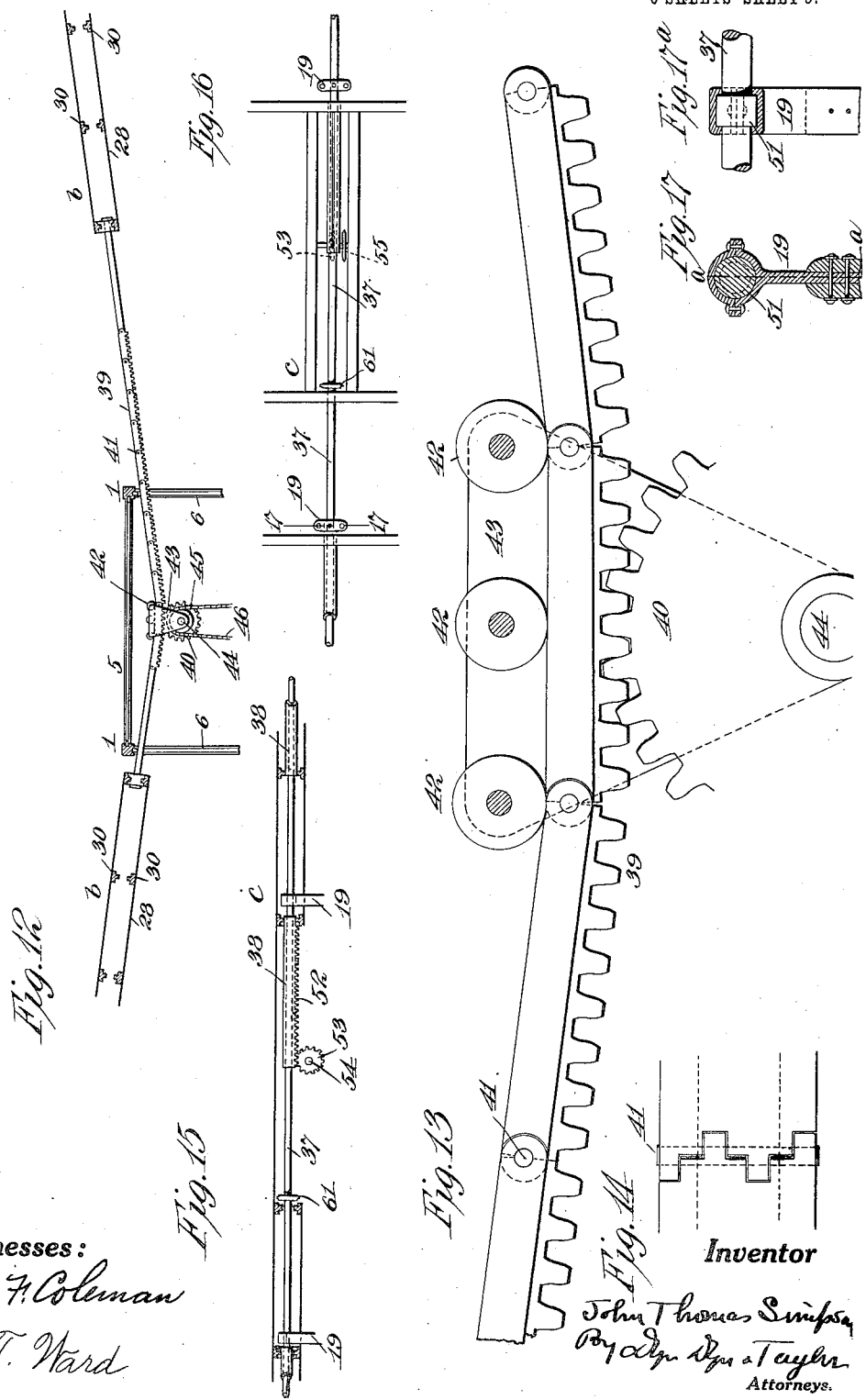

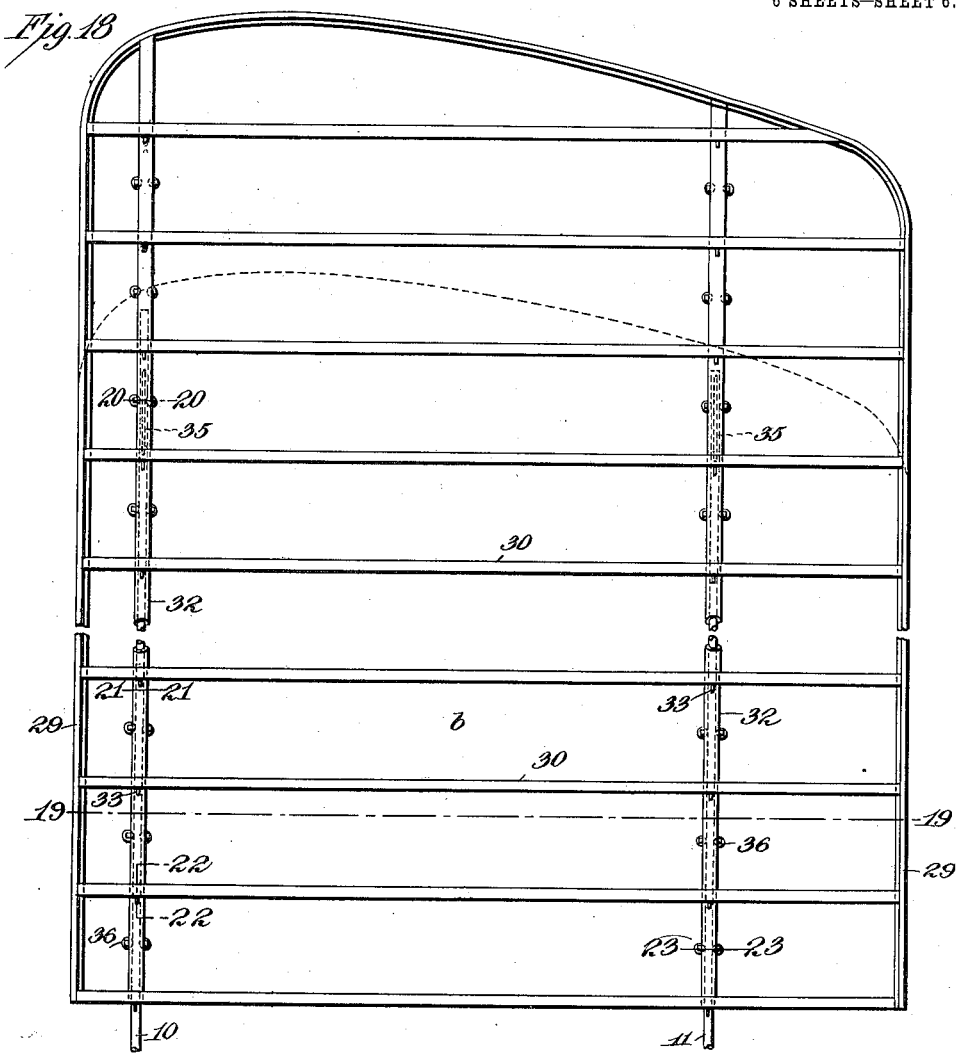

UNITED STATES PATENT OFFICE.

JOHN THOMAS SIMPSON, OF NEWARK, NEW JERSEY.

AEROPLANE.

1,056,844. Specification of Letters Patent. Patented Mar. 25, 1913.

Application filed April 5, 1910. Serial No. 553,621.

*To all whom it may concern:*

Be it known that I, JOHN THOMAS SIMPSON, a citizen of the United States, and residing in Newark, in the county of Essex and State of New Jersey, have invented a certain new and useful Aeroplane, of which the following is a specification.

The object I have in view is the production of an aeroplane, or heavier-than-air flying machine, which will have improvements in the frame, which will be rigid and light, the stabilizing devices of which will be simple, strong and effective, the steering devices of which will be improved, the balancing devices of which will be simplified and improved, and the alighting devices of which will be improved and simplified.

Further objects relate to details of construction, as will more fully appear from the following specification and accompanying drawings, considered together or separately.

In the drawings: Figure 1 is a plan view of an aeroplane embodying my invention, with the superposed plane removed. Fig. 2 is a side elevation of the same, showing the superposed plane. Fig. 3 is a front view, with the superposed plane removed. Fig. 4 is an enlarged side elevation of the front end of the chassis. Fig. 4ᵃ is a cross-section of a modified form of frame. Fig. 5 is an enlarged side elevation of the rear end of the chassis. Fig. 6 is an enlarged plan view of the same. Fig. 7 is a detail section on the line 7—7 of Fig. 6. Fig. 8 is a detail section on the line 8—8 of Fig. 6, looking toward the rear. Fig. 9 is a detail section of the body. Fig. 10 is a section on the line 10—10 of Fig. 9. Fig. 11 is a section on the line 11—11 of the Fig. 9. Fig. 11ᵃ is a plan view of a modified form of structure. Fig. 12 is a detail section of the lateral stabilizing mechanism on the main plane. Fig. 13 is an enlarged detail of this mechanism. Fig. 14 is a plan view of a portion of the flexible rack in this mechanism. Fig. 15 is a detail section of the lateral stabilizing mechanism on the rear plane. Fig. 16 is a plan view of the same. Fig. 17 is a section on the line 17—17 of Fig. 16. Fig. 17ᵃ is a section at right angles to Fig. 17. Fig. 18 is a plan view of half of the main plane, with the skin removed. Fig. 19 is a section on the line 19—19 of Fig. 18. Fig. 20 is a section on the line 20—20 of Fig. 18. Fig. 21 is a section on the line 21—21 of Fig. 18. Fig. 22 is a section on the line 22—22 of Fig. 18. Fig. 23 is a section on the line 23—23 of Fig. 18. Fig. 24 is a front elevation of a modification using a rigid rack in the stabilizing apparatus.

In all of the views, like parts are designated by the same reference characters.

For clearness of understanding I will first describe the more general points of the embodiment of my invention chosen for illustration, and then will severally describe the various details in connection with the complete device.

The apparatus, generally, comprises an open-work box-like frame or body, made up of tension and compression members, with filamentous tension members. This box-like body is supported upon wheels, so that the forward impetus can be secured in launching and so that the apparatus may alight and be brought to rest without accident. The body is supplied with main supporting plane located at one extremity and with the balancing or adjusting plane located at the other. I prefer, in practice, and I illustrate in the drawings, a construction in which the main supporting plane is in the front and the auxiliary and adjusting plane is in the rear, but it will be understood that the direction of travel of the apparatus in relation to the location of the planes is immaterial, as it may be so arranged as to move in the other direction, that is to say, with the main supporting plane in the rear (see Fig. 11ᵃ). The main plane is mounted or supported in a fixed framework, arranged at the proper dihedral angle, and with a certain amount of lateral movement, by means of which lateral stability is secured. The auxiliary or balancing plane has, in addition, a movement about a horizontal axis, so that the apparatus is made to ascend or descend, and may be generally balanced in a horizontal plane in the direction of the longitudinal axis of the apparatus. In addition to these planes, I provide vertical planes or direction rudders, by means of which the direction from right to left is changed, and in which the direction of the apparatus is preserved, irrespective of forces tending to swerve it from its direct path, which may be caused by the leveling effect of the stabilizing devices. These vertical planes, or rudders, are also so arranged that they may be swung athwartship and will act as a brake. Having now made these preliminary observations of the complete device, I will now describe in detail the embodiment chosen for illustration.

*The chassis.*—The body or back-bone of the chassis is formed of a box-like, open-work structure, made up of compression and tension elements and additional filamentous members. The body extends in a substantially horizontal direction from the front to the rear of the chassis. The body is indicated in Figs. 1 and 2 by *a*. In Figs. 1 and 2 the main plane *b* is shown and the auxiliary planes *c*. Reference being had to Fig. 2, it will be observed that there is a superposed plane *b'* above the main plane *b*. This superposed plane is fixed in relation to the chassis, but it may be movable. The main plane *b* is in two sections. *d* are the vertical rudders. In the same views, *e* represents the engine, *f* the propeller, *g* the front wheels, and *h* the rear wheels. Two propellers are illustrated in Fig. 11ª. The details of the chassis are best shown in Figs. 4, 5, 6 and 9. The body comprises four longitudinal members 1, 1 and 2, 2, 1, 1 being the upper members and 2, 2 the lower members. These members I prefer to so arrange as to make the body of substantially rectangular cross-section. Fig. 4ª shows a body of triangular cross section. As the most suitable material, I prefer to use spruce. The upper members 1, 1, at the rear end of the body, curve downward, as shown in Fig. 5, producing a support for the rear wheel *h*. The lower members at the rear of the frame curve upward and outward, producing a support for the bearings, upon which is mounted the auxiliary plane *c*. The front end of the frame is formed of an arch or hoop 3, the two lower extremities being connected to the ends of the lower members 2, 2, and its curved upper part connected to the forward members of the upper members 1, 1. This arch or hoop 3 serves to support the outer bearing of the propeller shaft 4. The four longitudinal members, viz., 1, 1 and 2, 2, are connected together at intervals by rectangular braces 5, 5 (see Figs. 1 and 2). Details of these braces are best shown in Fig. 9. The lower and inner edges of the longitudinal members 1 and the upper and inner edges of the lower members 2 are grooved, as shown in Fig. 9, and in these grooves are attached longitudinal strengthening members 6. The material I prefer to use for these members is hickory. As shown in Figs. 5 and 6, for example, these strengthening members 6 are in the form of flattened hoops, or in other words, are continuous between the braces 5, 5, each strengthening member being continuous. The upper horizontal member runs down the inside of one of the members 1, to brace 5; it then runs across such brace to the inside of the opposite upper member 1, is there bent at a right angle, and then runs back to the next brace 5, is bent at a right angle, runs across such brace to the inside of the first upper member 1, is then bent at a right angle and runs to the place of beginning. The strengthening members 6, 6 on the sides and bottom are identical with that just described. The braces 5 are formed integral with the strengthening member 6, and are best shown in Figs. 9, 10 and 11. Reference being had to the right side of Fig. 9, the brace 5 extends upward and is bent to the left, forming a right angle curve, and extends along the upper strengthening member 6, and is secured thereto. Reference to Fig. 11 will show that the strengthening member 6 and brace 5 on the section lines 11, 11 are in one piece. Reference being had to Fig. 10, which represents the cross-section on the line 10—10, will show that the brace 5 is not integral with the upper strengthening member to which it is secured. Each strengthening member 6, 6 at each point where it crosses from one longitudinal member to the other, is provided with one of these braces 5, the ends of the braces being such that their ends abut, producing a continuous frame. The curved portions indicated at 7 are perforated each for the passage of a bolt 8, as shown, the head of which is secured to a wire 9 or other filamentous device crossing to the opposite corner of the brace. These bolts are provided with nuts, as shown, by means of which tension can be put upon the wires. Looking at the frame from the side, it will be seen that by bending the strengthening member 6, as described, the body will be composed of a number of contiguous rectangular or approximately rectangular frames. The corners of these frames are rounded, as shown, and at the corner is located a bolt, as 8 in Fig. 10, and at the diagonals are wires 9, 9, as before described. These wires are omitted from Figs. 4, 5 and 6, in order to avoid confusion, but they are placed in Figs. 1 and 2. These wire braces, together with the braces 5 and strengthening members 6, produce a very rigid and light structure. They also permit of repairs, as it is possible to remove any broken strengthening member or brace without destroying the entire frame.

The main plane *b*, *b*, as described, is formed of two parts divided at or adjacent to the center, and as before stated, these planes are laterally movable for stabilizing the structure when in flight. They are supported upon a rigid framework, which is attached to and forms a portion of the chassis. This framework is composed of two parallel members 10, 11 (see Figs. 3 and 18). These members may be made rectangular or circular in cross-section, and may be made of metal tubing, or of wood. They are bent upward from the center at the correct dihedral angle and are secured to the body. These supports 10 and 11 are connected at their centers to the top of the body a. In addition, they are supported on each side of the body by a depending frame-like structure. This frame comprises compression and tension members. The compressing members are shown best in Figs. 3 and 4. They are formed of a forward bar 12 and a rear bar 13. These bars are connected to the members 10 and 11 respectively, and extend downward and forward, and meet a third bar 14. This bar 14 is connected to the lower member 2 of the body and extends forward to a bearing for the axle of the front wheels g, g. The forward tension bar 12 comes down to the member 14, and is curved at this place, as shown in Fig. 4, while the bar 13 enters the joint between 12 and 14, and the three are connected together by bolts, as shown. The lower member 14, and the upper member 12, from the point of intersection to their free end, are placed back to back, and a steel spring or other metallic strap 15 is inserted between the two parts. The forward end of this strap is bent around the bearing of the axle for the wheels g, g. This strap imparts elasticity to the forward end of the member 14, and allows the members to bend when the device alights, preventing jars or shocks, and when it bends sufficiently, the load will be taken up directly by the members 14 engaging with the ground acting as a skid or sled. In addition to the compression bars 12 and 13, the plane supports 10 and 11 are further supported by wires or other filamentous members 16, 16, such members connecting at about the intersection of the bar 12, with the member 14.

The rear end of the chassis will now be described, reference being had to Figs. 5, 6 and 8.

As already stated, the lower members 2, 2, at the rear of the frame, are spread apart and upward to form supports for the bearings of the plane c, while the upper members 1, 1 are bent downward to form a support for the bearings of the wheel h. In addition to the bent down upper members 1, 1, a brace 17 is on each side, such brace extending to the end of the chassis, and being connected to the lower face of the upper member 1 at its rear end. In addition to these, a vertical member 18 extends upward to the free ends of the lower members 2, 2, at the bearings 19, for the support of the rear plane c. The rear wheel h is supported in a frame 20, such frame being pivoted at 21, and being held downward by elastic devices 22. Bands of soft rubber may be employed for this purpose. The rear portion of the frame 20 encircles the rear wheel, and is best made, as shown in Fig. 7, of tubular form. The ends of the axle of the wheel h lie within this tube, and the wires which are used to steer the rear wheel also lie within the tube, being supported in position by means of pulleys or wheels 23, the wire being shown at 24.

In addition to the parts already described, there is a frame or bracket 25 on each side for supporting the vertical planes or rudders d, d. These brackets are formed of members at right angles to the longitudinal plane of the chassis, and bracing members diagonal thereto, as best shown in Fig. 6. In addition to the parts described, there are necessary supports for the motor and also the seat for the aviator, and also the liquid fuel tank 27.

*The main supporting plane.*—The details of this plane are best shown in Figs. 18–23 inclusive. The plane, as described, is made in two sections, one on each side of the chassis, and it surrounds or incloses the members 10 and 11, and slides upon the latter. It may, however, be made in one piece similar to the auxiliary plane which will be described later. Each section of the plane is formed of an envelop or skin 28, made of a suitable material, stretched over an edge member 29, made preferably of wood, and in addition to this edge member, which extends from the front edge of the plane around the outer end and along the back edge, are top and bottom transverse members 30. These members are connected at their ends to the edge member 29 and intermediate of their ends by braces 31. These braces are the requisite length, so that the planes will have the desired cross-section. This produces a light, strong and rigid plane. The connections of the planes to the members 10 and 11 are as follows: Considering the member 10 first, this member is shown as formed of tubing of circular cross-section. The transverse member is shown in Fig. 22 of I cross-section. A tube 32 is supported within the plane, and this tube surrounds the member 10. The weight of the plane is supported upon rollers 33, carried in brackets (Fig. 22), said brackets being secured to the transverse members 30, 30. On the other side of each transverse member a portion of the tube 32 is struck up at 34, back of the base of the roller, securing the tube to the transverse member. The tube 32 is provided with slots 35, for the passage of the stays 16, 16, and bars 12, 13. The skin or envelop is also provided with slits at these points, so as to permit the plane to be slid along the members 10 and 11. The connection with the member 11 is similar to that of member 10, but, owing to the fact that the plane at this point is too narrow to accommodate a member of circular cross-section, the member 11 (see Fig.

23) is of flat cross-section. In addition to the wheels 33, 33, which engage upon one side of members 10 and 11, additional wheels 36 are provided to take the thrust in a direction at right angles to the wheels 33, 33.

The auxiliary plane c is built up substantially the same as the main plane, and is supported upon a single shaft 37 (see Fig. 15). This plane is provided with a tube 38, which surrounds the shaft 37, and is supported upon the same by rollers in the same manner as the main plane is supported upon the members 10 and 11.

*The stabilizing devices.*—The main plane is moved from side to side in order to stabilize the apparatus when in flight. It is apparent that if the apparatus has a tendency to fall to the right, and if the planes be moved to the right, the center of gravity will be shifted, under the center of support, to the left, thereby causing a downward thrust on the left, which will counter-balance the lowering tendency on the right. The lowering tendency on the left will be made by moving the plane in that direction. One way of moving the plane for stabilizing is shown in Figs. 12, 13 and 14. The two sections of the plane are connected by a rack 39, which engages with the pinion 40. As the two sections of the plane are cocked up at an angle necessary to the dihedral position, the rack 39 is made flexible, and in sections, jointed together, as shown. The joint is shown in Fig. 14, connection between the sections being made by means of pintles 41. The rack is held in contact with the pinion 40 by rollers 42, supported within a frame 43. It is apparent, by rotating the pinion 40 in either direction, that the rack 39, and with it the sections of the planes, will be bodily moved from the right to the left, or vice versa.

The means for actuating the pinion 40 is best shown in Fig. 4. The pinion 40 is mounted upon a shaft 44, the other end of which carries a sprocket 45. Over this sprocket 45 passes a chain 46, which in turn engages with a sprocket 47. This sprocket 47 is mounted upon a sleeve 48, which is mounted upon a shaft 49. This shaft 49 is mounted in suitable bearings in the body and is provided with a hand-wheel 50, by means of which the aviator can turn the shaft 49, the sleeve 48 and the sprockets, chain and pinion 40, and with it the rack. The sleeve 48 is splined or otherwise connected to the shaft 49 so that it will be rotated by the latter, but the shaft will be free to be moved longitudinally, without moving the sleeve, a device (not shown) being provided to keep the sleeve from moving longitudinally.

*The auxiliary plane control.*—This is best shown in Figs. 15, 16, 17 and 17ª. As before described, the shaft 37 is mounted in bearings 19, which are attached to the rear extremities of the lower longitudinal members 2, 2. The bearings 19 are best shown in Figs. 17 and 17ª. The shaft 37 is provided with a collar 51, in the bearings, so that the shaft cannot move longitudinally. The tubes 38, which are carried by the plane, are splined or otherwise attached to the shaft 37, so that they turn as the latter is turned. A section of the tube 38 is provided with a rack 52, such rack extending around the portion of the periphery of the tube, and this rack engages with the pinion 53. This pinion 53 is mounted on a shaft 54, and on the other end of the shaft is the sprocket 55. A chain 56 passes over this sprocket. To the ends of the chain are attached wires 57, which lead around suitable guide pulleys 58 to the front of the chassis (see Fig. 4). They are connected to a chain 59, which engages with a sprocket gear 60, such sprocket gear being carried upon the sleeve 48 and turning with the latter. It is apparent, therefore, that as the main plane is laterally shifted for stabilizing, the auxiliary plane will be, similarly moved, through the agency of the wires 57, sprocket and gear 53, which will mesh with the rack 52, and thereby move the plane athwartship, or laterally.

*The auxiliary plane tilting mechanism.*—The mechanism for tilting the auxiliary plane, by which vertical steering will be produced, is as follows: It consists of means for rotating the shaft 37, and with it the auxiliary plane. The shaft 37 is provided with a sprocket wheel 61 (see Figs. 15 and 5). A chain 62 engages with the sprocket wheel, and at the ends of the chain are wires 63. These wires pass around guide pulleys 64 and lead to the forward part of the chassis to a chain 65. This chain 65 passes around a sprocket wheel 66, on the shaft of which is a pinion 67 (see Fig. 4). This pinion 67 is engaged by a circular rack 68, carried upon the shaft 49. A circular rack is chosen so that its teeth will always be in engagement with the teeth of the gear 67. It is apparent that by longitudinal movement of the shaft 49 the engagement of the teeth of the rack 68 and the teeth of gear 67 will rotate the sprocket 66, will move the chain 65, and through the agency of the wires 63 and chain 62, the sprocket 61 will be turned, rotating the shaft 37, and thereby tilting the auxiliary plane c, and thereby steering the machine in a vertical plane.

*The steering rudders.*—The steering rudders d, d, are best shown in Figs. 5, 6 and 8. These rudders, as already stated, are so arranged that they may be swung around athwartship to act as a brake, which is useful particularly in making a descent. The mechanism for moving the rudders, when used as rudders, per se, is as follows: Each rudder is provided with an arm 69 on its inner face immediately behind its point of pivot. To each arm is connected a rod or link 70. The inner ends of these arms or links are pivoted to a block 71. This block is mounted upon a swinging arm 72 (see Fig. 5). This arm 72 is mounted at 73, so as to turn about a vertical axis. The shaft 73 is provided with a sprocket wheel 74. Around this sprocket wheel is a chain 75. Connected to the chain are wires 76 leading from the rear of chassis to the foot steering lever 77. It is apparent that the movement of this foot steering lever will turn the shaft 73 and swing the swinging arm 72, and the rudders, through the connections of the arms or links 70, will be turned upon their pivot. In addition to this steering means, means is also provided for simultaneously turning the rear wheel for steering. This is made possible by providing a yoke 78 upon the shaft 73, and connecting the ends of the same to the wires 24. It is, therefore, apparent that the rear wheel will be turned in a proper direction at the same time that the rudders $d$, $d$, are turned for steering.

The means for manipulating the rudders $d$, $d$, so that they act as a wind brake is as follows: The block 71 is so mounted upon the swinging arm 72 that it may be moved toward the rear, thereby acting upon the principle of a toggle with the arms or links 70, and simultaneously turning the rudders $d$, $d$ upon their axis so as to bring them square across, as shown in dotted lines in Fig. 6. The means for actuating the block 71 comprises a chain 79, which passes around a wheel 80 upon the rear extremity of the swinging arm 72. The ends of this chain are connected to wires 81, 81, which lead forward to a lever 82, within convenient reach of the aviator.

For the purpose of applying a brake to the front wheels for use when landing, I provide a band brake 83 upon the front wheels, said band brake being actuated by a wire 84, which is connected to a suitable lever. I prefer to utilize the lever 82 for this purpose, so that as the rudders $d$, $d$ are turned to form a wind brake, the band brake 83 will be simultaneously applied.

My invention may be modified in many ways, Fig. 24 showing a structure in which a rigid rack is used in place of the jointed rack 39 shown in Fig. 12. This rigid rack 85 is connected to the arms, such arms and supporting members 10 and 11 being curved, so as to get the correct dihedral angle.

If desired, the main plane can be made in one piece, similar to the auxiliary plane. The plane $b'$, when added to the structure shown in Fig. 1, produces a biplane, as shown in Fig. 2. It increases the capacity of the machine, without changing its lineal dimensions, or the general arrangement of frame and planes. More than one additional plane similar to the plane $b'$ may be added. These added planes may be stationary or they may be duplicates of the main plane and will, therefore, be adjusted laterally. The engine $e$ I show in Fig. 4 as provided with a starting crank 86, such crank being adjacent to the seat 26 of the aeronaut. I also provide a driving mechanism with a clutch 87, such clutch being actuated by a lever 88, also within convenient reach of the aeronaut. By this device, the engine can be cranked and started when in flight. It may also be cranked and started when the machine is at rest, and the device started up after the engine is going, by application of the clutch. I provide the fuel tank 27 with a level gage 27', also within view of the aeronaut, so that he can at all times know the condition of the fuel supply.

In the structure shown in Fig. 11$^a$, there are two propellers, one on each side, and behind the main planes $b$. The auxiliary plane $c$ is in front; the steering rudders $d$, $d$ are behind the propellers $f$, $f$, and in addition there is another plane 89 to assist in balancing. This arrangement has some advantages over the one which travels in the other direction, one advantage being that it will rise from the ground with greater ease.

It will be apparent from the general description of my invention that the main supporting planes have no wing tips, sliding panels or warping surfaces, and that the devices can be stabilized without changing the angle of incidence of the planes with respect to the longitudinal or transverse axis. It is also apparent that the apparatus is free from the tendency to turn from the true line flight during stabilizing, as is the case with wing tips and warped surfaces. The device is also stabilized, and may be used to land during a turn, without cutting off the power. The entire device is small, compact, economical to construct and is capable of being housed in close quarters without being taken apart. My controlling devices have varied advantages, as they may be operated by one hand, leaving the other hand free to actuate the motor, control the fuel or apply the brake. A further advantage of my device is that it can be stabilized without the use of a vertical rudder, the latter being for direction steering only.

In accordance with the provisions of the patent statutes, I have described the principle of my invention, together with the apparatus which I now consider to represent the best embodiment thereof; but I desire to have it understood that the apparatus shown is merely illustrative and that the invention can be carried out in other ways.

Having now described my invention, what

I claim as new and desire to secure by Letters Patent, is:—

1. An aeroplane having a frame, a sustaining plane, and a balancing plane, said planes being separately connected to the frame, and having mechanism by which they are moved from side to side to obtain stability.

2. The combination in an aeroplane of a frame, a main plane and a balancing plane, separate connections from the two planes to the frame, means for simultaneously moving the two planes from side to side to maintain stability.

3. In an aeroplane, in combination with stabilizing and vertical steering planes, means for actuating the planes, said means comprising a shaft, bearings for the shaft permitting longitudinal and rotary movement, manual means for rotating the shaft, a circular rack on the shaft, a gear engaging with the rack, and connections between the gear and vertical steering plane, and connections between the shaft and the stabilizing plane.

4. In an aeroplane, the combination of supporting planes and propelling mechanism, of a frame, said frame having an elastic extension extending in the front, a wheel carried on the front of the said extension, said extension having a portion which comes into contact with the ground when the skid is flexed, forming an elastic skid for alighting.

5. The frame for an aeroplane which comprises a skeleton cellular structure comprising longitudinal through members, and bracing members bent to rectangular form, such bracing members lying between the through members both longitudinally and laterally.

6. An aeroplane having a frame, supports thereon, and double surface planes sliding on the supports, the said supports lying between the surfaces, and anti-friction devices interposed between the planes and the supports, said devices lying between the surfaces.

7. An aeroplane having a frame, a wheel and a brake for the wheel, and a wind brake, and means for simultaneously actuating both brakes.

8. A flying machine having a controlling shaft, a circular rack on the shaft, a gear meshing with the teeth of the rack, connections operated by the gear for controlling the angle of incidence of the machine, and independent connections controlled by the rotation of the shaft for controlling the stabilizing of the machine.

This specification signed and witnessed this first day of April, 1910.

JOHN THOMAS SIMPSON.

Witnesses:
 LEONARD H. DYER,
 JOHN L. LOTSCH.